(12) United States Patent
Stefani

(10) Patent No.: US 7,874,608 B2
(45) Date of Patent: Jan. 25, 2011

(54) CAR WITH INNOVATIVE FRONT DOOR OPENING

(75) Inventor: Giovanni Stefani, Sassuolo (IT)

(73) Assignee: Ferrari S.p.A., Modena (IT)

( * ) Notice: Subject to any disclaimer, the term of this patent is extended or adjusted under 35 U.S.C. 154(b) by 0 days.

(21) Appl. No.: 12/385,600

(22) Filed: Apr. 14, 2009

(65) Prior Publication Data

US 2009/0261618 A1   Oct. 22, 2009

(30) Foreign Application Priority Data

Apr. 15, 2008   (IT)   ............... BO2008A0229

(51) Int. Cl.
   *B60J 5/04*   (2006.01)
(52) U.S. Cl. ............... 296/146.11; 296/202; 296/198
(58) Field of Classification Search ............ 296/146.11, 296/146.12, 202, 198; 49/40, 41
See application file for complete search history.

(56) References Cited

U.S. PATENT DOCUMENTS

| 2,777,728 | A | * | 1/1957 | Barenyi | ................. | 296/193.12 |
| 2,785,921 | A | * | 3/1957 | Barenyi | ................. | 296/216.02 |
| 4,678,198 | A |   | 7/1987 | Nomura |   |   |
| 6,030,025 | A | * | 2/2000 | Kanerva | ................. | 296/146.12 |
| 7,178,853 | B2 | * | 2/2007 | Oxley et al. | ............ | 296/146.11 |

FOREIGN PATENT DOCUMENTS

| DE | 20120816 | 3/2002 |
| EP | 0129067 | 12/1984 |
| FR | 2869633 | 11/2005 |
| JP | 61-155021 | 7/1986 |
| JP | 05-071260 | 3/1993 |

OTHER PUBLICATIONS

Anonymous: "Dual-link Roll Up Vehicle Door" Research Disclosure, Mason Publications, Hampshire, GB, vol. 304, No. 75, Aug. 1, 1989, XP007114078, ISSN: 0374-4353.
European Search Report mailed Jul. 10, 2009 in European Appln. No. 09157840.1.

* cited by examiner

*Primary Examiner*—Dennis H Pedder
(74) *Attorney, Agent, or Firm*—Davidson Berquist Jackson & Gowdey, LLP

(57) ABSTRACT

A car provided with: a chassis supporting a pair of front wheels which turn about a first horizontal rotation axis and a pair of rear wheels which turn about a second horizontal rotation axis; a passenger compartment obtained between the front wheels and the rear wheels; and at least one pair of front doors, each of which is hinged to the chassis by means of a hinge to turn about a third rotation axis between an opening position and a closing position of the passenger compartment; the hinges of the front doors are arranged in proximity to the first rotation axis of the front wheels so that the projection on a horizontal plane of the hinges is within the rectangular area comprised between the two front wheels.

23 Claims, 5 Drawing Sheets

CAR WITH INNOVATIVE FRONT DOOR OPENING

TECHNICAL FIELD

The present invention relates to a car.

PRIOR ART

A car presents a chassis which supports a pair of front wheels and a pair of rear wheels: between the front wheels and the rear wheels a passenger compartment is obtained, which is accessed through at least a pair of front doors, each of which is hinged to the chassis by means of a hinge to turn about a rotation axis between an opening position and a closing position of the passenger compartment.

In most cars, the rotation axes of the hinges of the front doors are vertical and the hinges of the front doors are fixed to two corresponding vertical pillars of the chassis arranged in retracted position with respect to the front wheels (i.e. at a certain distance from the wheelhouses of the front wheels). Such a configuration of the front door hinges ensures an excellent accessibility to the passenger compartment of the cars widely present on the market. However, such a configuration of the front door hinges does not allow a good accessibility to the passenger compartment of a top-performance sports car, particularly when the engine is arranged in central position.

In a top-performance sports car, it has been suggested to use a horizontal rotation axis arranged longitudinally for the front doors (in actual fact the only doors of the car): in this case, the hinges are arranged in upper position to obtain a so-called "gull wing" door (such a solution was used for example on the Mercedes 300 SL made in the years from 1954 to 1957). In a top-performance sports car, it has also been suggested to use a horizontal rotation axis arranged transversally for the front doors (in actual fact the only doors of the car): in this case, the hinges are arranged in front position (such a solution was used for example on the Lamborghini Countach made in the years from 1973 to 1990).

However, none of the solutions suggested until now allows to obtain a good accessibility to the passenger compartment of a top-performance sports car, particularly when the engine is arranged in central position.

DESCRIPTION OF THE INVENTION

It is the object of the present invention to provide a car which is free from the above-described drawbacks, and which is at the same time easy and cost-effective to make.

According to the present invention, a car is provided as disclosed in the attached claims.

BRIEF DESCRIPTION OF THE DRAWINGS

The present invention will now be described with reference to the accompanying drawings, which illustrate a non-limitative embodiment thereof, in which.

PREFERRED EMBODIMENTS OF THE INVENTION

Figure 1:
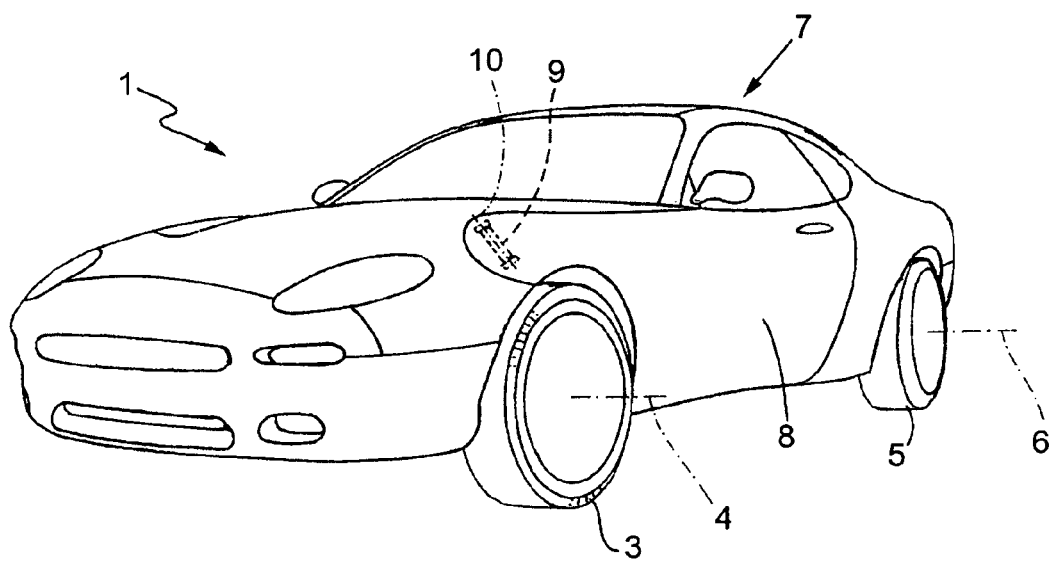
FIG. 1 is a perspective, diagrammatic view of a car made according to the present invention.
Figure 5:
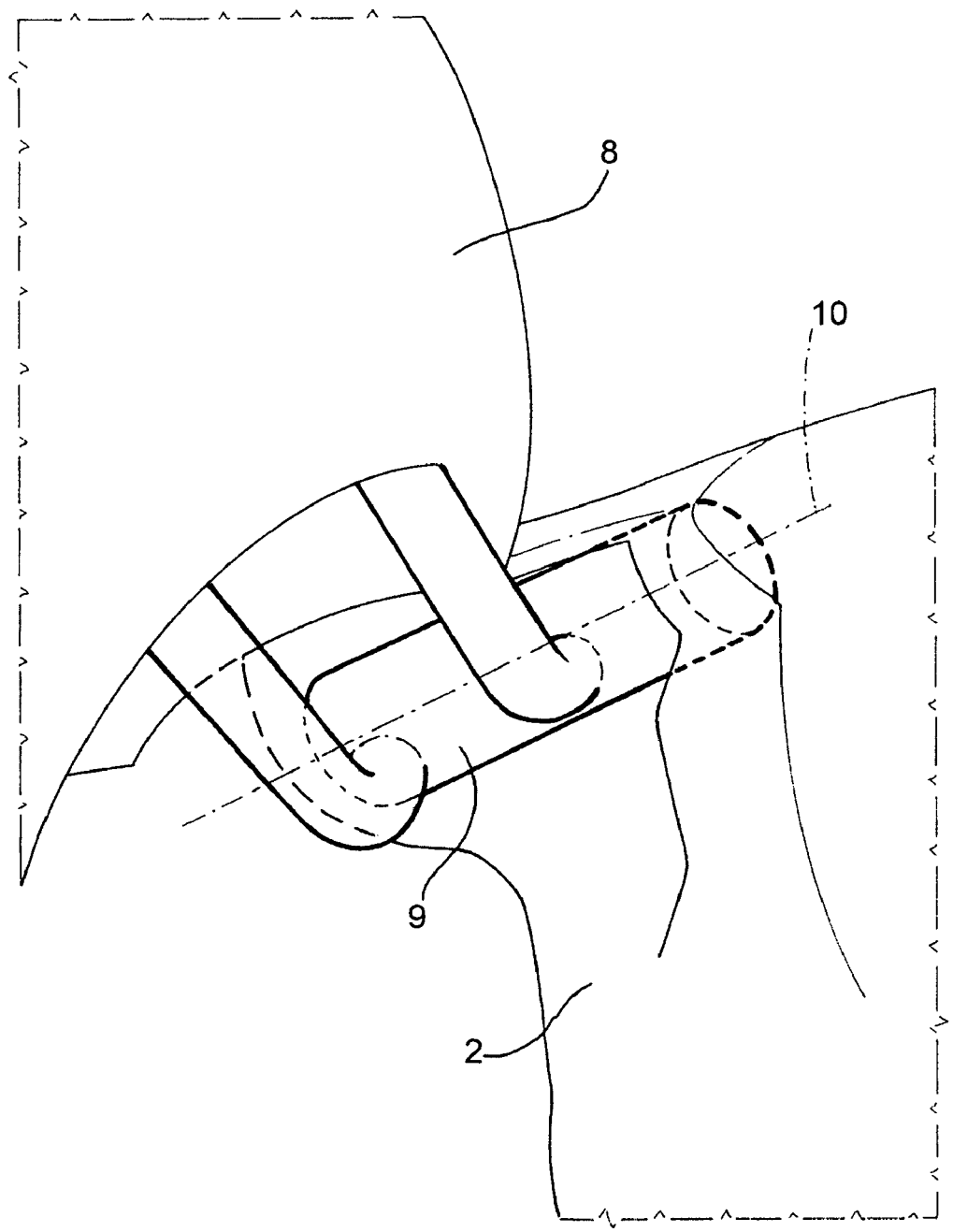
FIG. 5 is a perspective, diagrammatic view of a hinge of a door of the car in FIG. 1.

In FIG. 1, numeral 1 indicates as a whole a car comprising a chassis or frame 2 (shown in detail in FIG. 5), which supports a pair of front wheels 3 which turn about a horizontal rotation axis 4 and a pair of rear wheels 5 which turn about a horizontal rotation axis 6.

A passenger compartment 7 is obtained between the front wheels 3 and the rear wheels 5; a pair of front doors 8 (in actual fact the only doors of the car 1) are provided to allow access to the passenger compartment 7, each of which door is hinged to the frame 2 by means of a hinge 9 to turn about a rotation axis 10 between an opening position (not shown) and a closing position of the passenger compartment 7.

Figure 3:
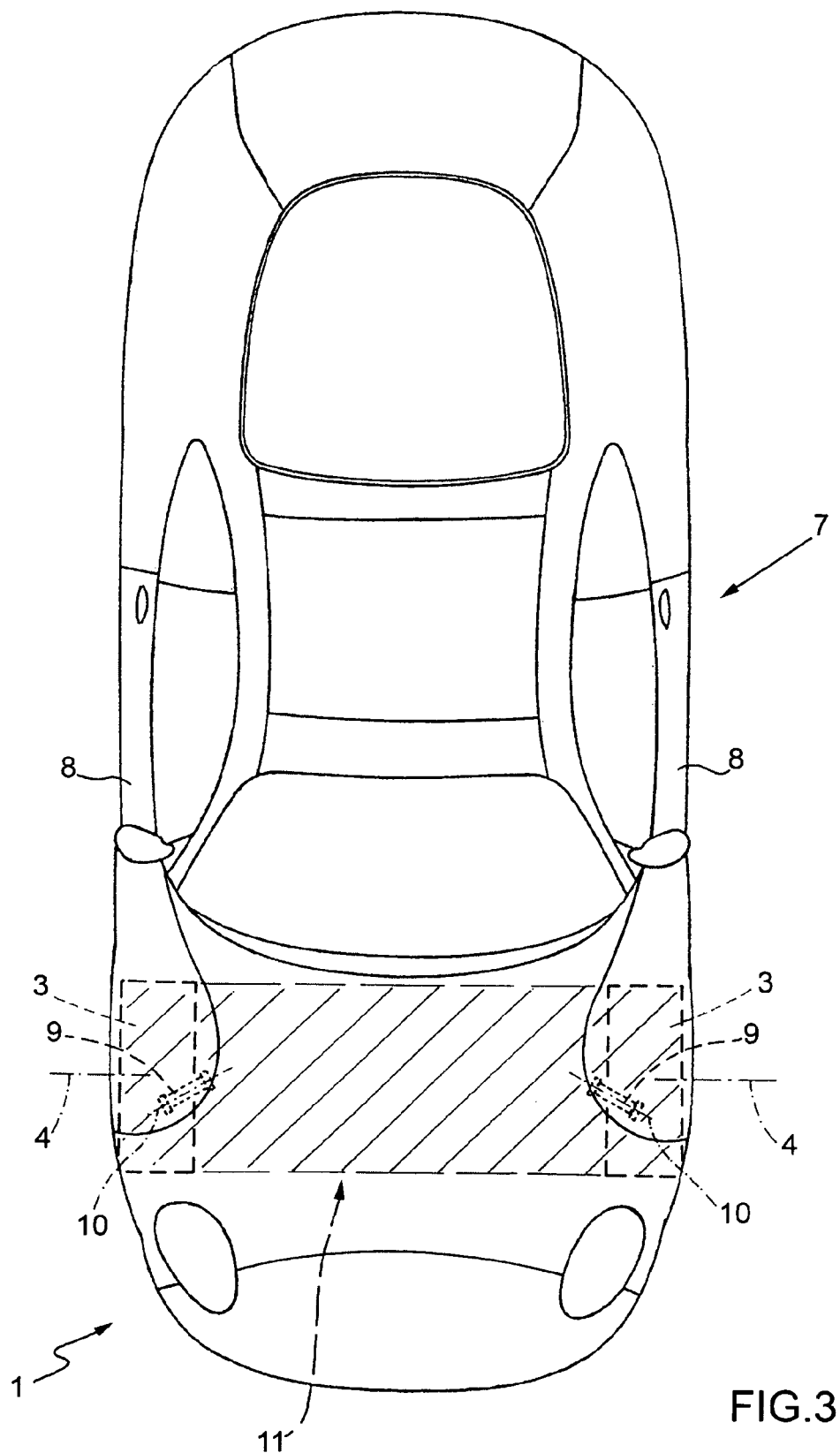
FIG. 3 is a plan, diagrammatic view of the car in FIG. 1.

As shown in the accompanying figures, the hinges 9 of the front doors 8 are arranged in proximity to the rotation axis 4 of the front wheels 3 so that the projection on a horizontal plane of the hinges 9 is within the rectangular area 11 (indicated by the dotted line in FIG. 3) comprised between the two front wheels. Preferably, each hinge 9 of a front door 8 is arranged by the side of a corresponding front wheel 3; according to an embodiment (not shown), the hinges 9 of the front doors 8 are at least partially arranged within the cylindrical volume comprised between the two front wheels 3.

Figure 4:
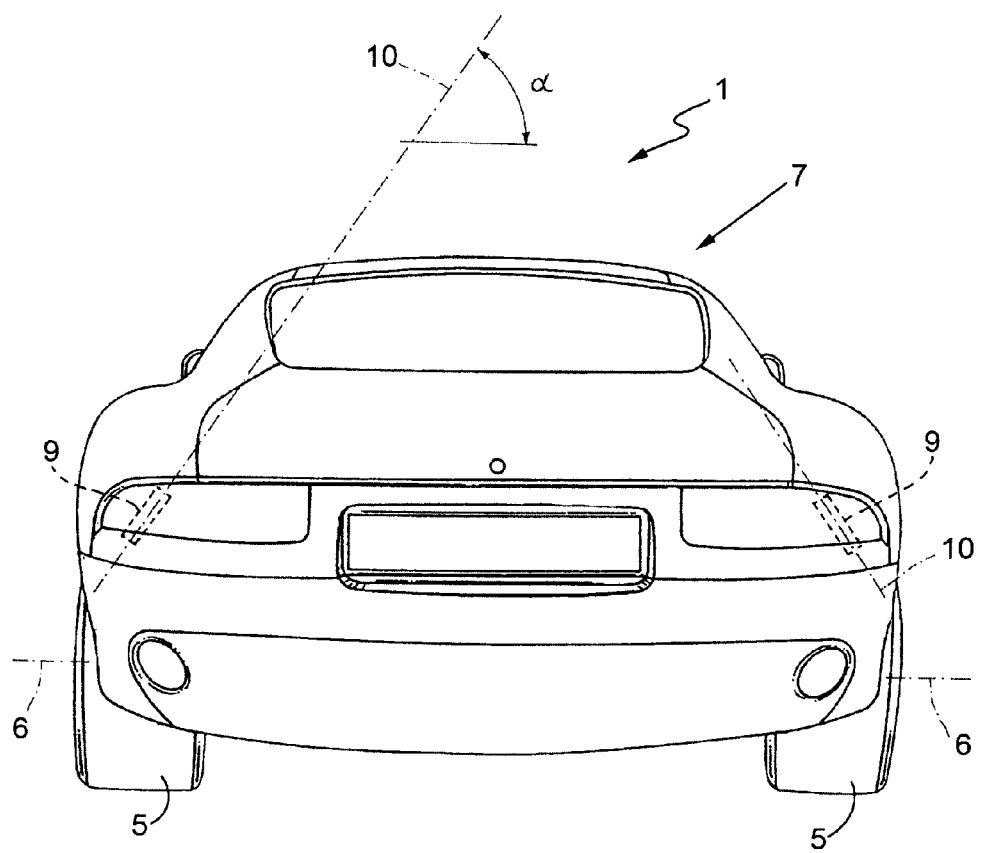
FIG. 4 is a rear, diagrammatic view of the car in FIG. 1.

As shown in FIG. 4, the rotation axis 10 of each hinge 9 forms an angle α comprised between 12° and 42° with the horizontal and on a vertical plane transversally arranged with respect to the car 1. Specifically, angle α is preferably comprised between 22° and 32° and is, for example, comprised about 27°.

Figure 2:
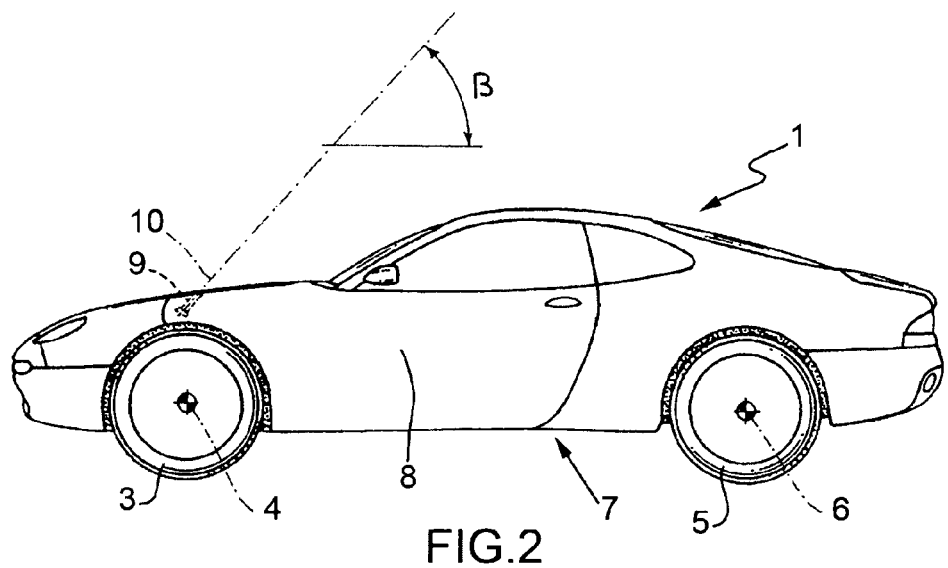
FIG. 2 is a side, diagrammatic view of the car in FIG. 1.

As shown in FIG. 2, the rotation axis 10 of each hinge 9 forms an angle β comprised between 40° and 70° with the horizontal and on a vertical plane longitudinally arranged with respect to the car 1. Specifically, angle β is preferably comprised between 50° and 60° and is, for example, comprised about 54°.

Figure 6:
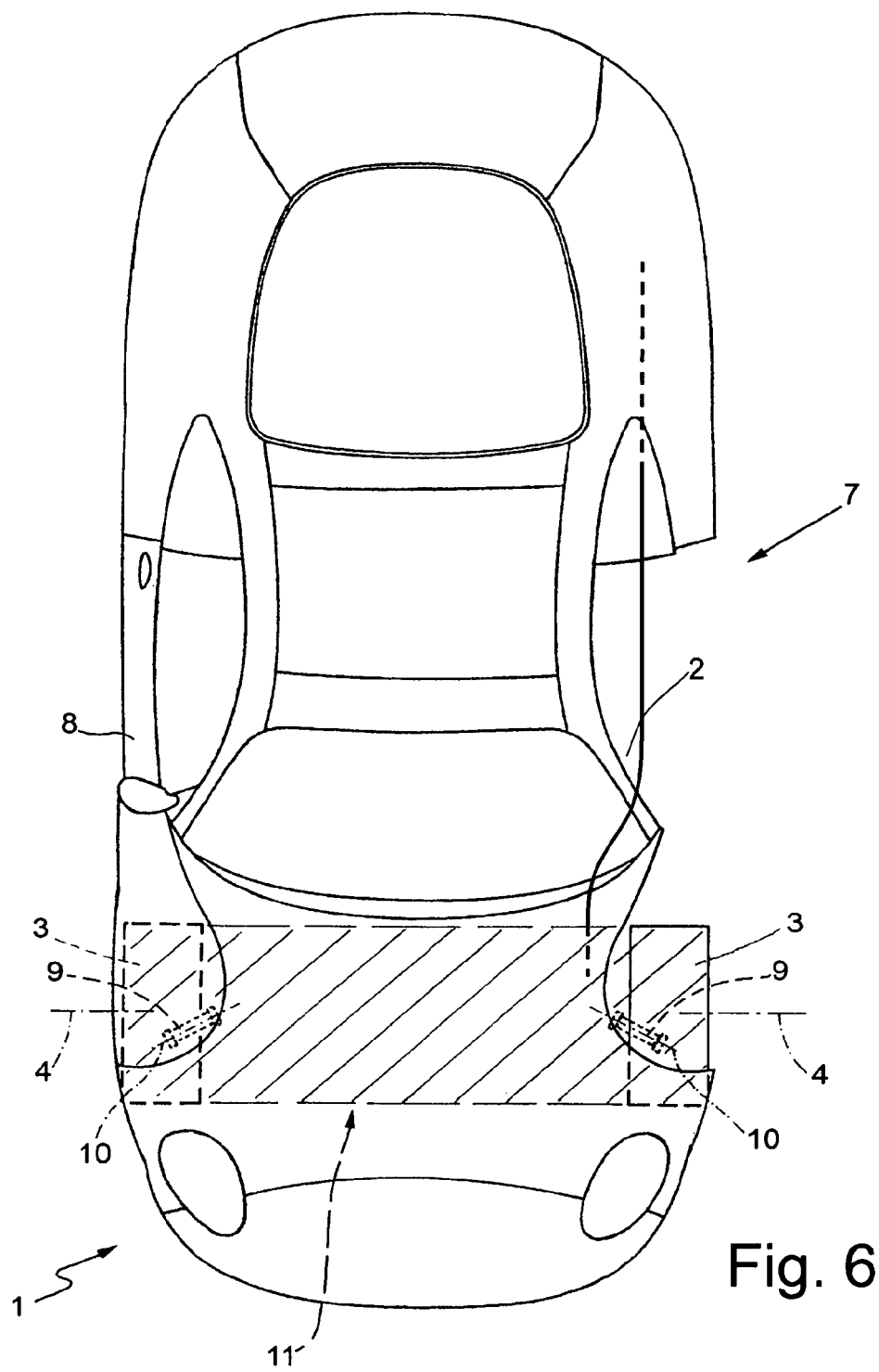
FIG. 6 is a plan, diagrammatic view of the car of FIG. 1 from which the left door has been removed, showing the chassis tapered toward the front wheel well and with the chassis being absent from the part under the door when closed.

Preferably, as shown in FIG. 6 the frame 2 is tapered towards the front wheel 3 at each front wheel 3 itself; in this manner, each front wheel 3 is not covered by the chassis 2 but is covered only by the corresponding front door 8 when the front door 8 is in the closed position.

With specific reference to FIGS. 1 and 2, according to a preferred embodiment, each front door 8 comprises the rear portion of the wing of the corresponding front wheel 3 and the corresponding sidemember (i.e. the portion of the chassis normally arranged under the front doors); thus, by effect of the fact that each front door 8 comprises the corresponding sidemember, no fixed component (i.e. no component secured to the front door 8) is present under the front door 8 when the front door itself 8 is closed. In this manner, when each front door 8 is opened, the rear part of the corresponding front wheel 3 is uncovered, and therefore, while getting in/out of the passenger compartment 7, a user may rest his or her foot immediately behind the front wheel 3 itself, thus making the operations of getting in/out particularly ergonomic and thus relatively simple, also for individuals with difficulty of movement. The ergonomics and simplicity of the operations of getting in/out is particularly felt in the case of a car 1 with a central engine, in which in the front seats the position of the hip is particularly advanced (i.e. moved frontwards); indeed, the user may rest his or her foot immediately behind the corresponding front wheel 3 (i.e. in very advanced position)

and is thus able to stretch his or her leg entirely or nearly entirely also in the case in which the position of the hip in the front seats is particularly advanced.

The above-described car 1 presents many advantages, because it is simple and cost-effective to make and above all offers excellent accessibility to the passenger compartment 7. It is worth noting that the excellent accessibility to the passenger compartment 7 is ensured both when the car 1 presents the engine arranged in front position (as shown in the accompanying figures) and when the car 1 presents the engine arranged in central or rear position.

The invention claimed is:

1. A car (1), comprising:
   a chassis (2) supporting a pair of front wheels (3) which turn about a first horizontal rotation axis (4) and a pair of rear wheels (5) which turn about a second horizontal rotation axis (6);
   a passenger compartment (7) arranged between the front wheels (3) and the rear wheels (5); and
   at least one pair of front doors (8), each of which is hinged to the chassis (2) by means of a single axis hinge (9) to turn about only one third rotation axis (10) between an opening position and a closing position of the passenger compartment (7);
   the car (1) is characterized in that the hinges (9) of the front doors (8) are arranged in proximity to the first rotation axis (4) of the front wheels (3) so that the projection on a horizontal plane of the hinges (9) is within a rectangular area (11) comprised between the two front wheels (3);
   wherein the chassis is tapered towards the front wheel at each front wheel;
   wherein each front door comprises the corresponding door sill, constituted by the portion of the chassis normally arranged under the front door, and thus no fixed component is present under the front door; and
   wherein each front door comprises the rear portion of a wing of the corresponding front wheel so that when each front door is opened, the rear part of the corresponding front wheel is uncovered.

2. A car according to claim 1, wherein each front door opens at an oblique upward angle corresponding to the third rotation axis.

3. A car (1) according to claim 1, wherein each hinge (9) of a front door (8) is arranged adjacent the corresponding front wheel (3).

4. A car (1) according to claim 1, wherein the third rotation axis (10) of each hinge (9) forms a first angle (α) comprised between 12° and 42° with the horizontal and on a vertical plane transversally arranged with respect to the car (1).

5. A car (1) according to claim 4, wherein the first angle (α) is comprised between 22° and 32°.

6. A car (1) according to claim 4, wherein the first angle (α) is comprised about 27°.

7. A car (1) according to claim 1, wherein the third rotation axis (10) of each hinge (9) forms a second angle (β) comprised between 40° and 70° with the horizontal and on a vertical plane longitudinally arranged with respect to the car (1).

8. A car (1) according to claim 7, wherein the second angle (β) is comprised between 50° and 60°.

9. A car (1) according to claim 7, wherein the second angle (β) is comprised about 54°.

10. A car, comprising:
    a chassis supporting a pair of front wheels which turn about a first horizontal rotation axis and a pair of rear wheels which turn about a second horizontal rotation axis;
    a passenger compartment arranged between the front wheels and the rear wheels; and
    at least one pair of front doors, each of which is hinged to the chassis by means of a single axis hinge to turn about only one third rotation axis between an opened position and a closed position of the passenger compartment;
    wherein the hinges are arranged in proximity to the first rotation axis of the front wheels so that the projection on a horizontal plane of the hinges is within a rectangular area defined between the pair of front wheels; and
    wherein a third rotation axis for each hinge forms a first angle (a) ranging between 12° and 42° with the horizontal and on a vertical plane transversally arranged with respect to the car.

11. The car according to claim 10, wherein the first angle (α) ranges between 22° and 32°.

12. The car according to claim 10, wherein the first angle (α) is about 27°.

13. The car according to claim 10, wherein the third rotation axis of each hinge forms a second angle (β) ranging between 40° and 70° with the horizontal and on a vertical plane longitudinally arranged with respect to the car.

14. The car according to claim 13, wherein the second angle (β) ranges between 50° and 60°.

15. The car according to claim 13, wherein the second angle (β) is about 54°.

16. The car according to claim 10, wherein each front door comprises the rear portion of a wing of the corresponding front wheel and a corresponding door sill.

17. A car, comprising:
    a chassis supporting a pair of front wheels which turn about a first horizontal rotation axis and a pair of rear wheels which turn about a second horizontal rotation axis;
    a passenger compartment arranged between the front wheels and the rear wheels; and
    at least one pair of front doors, each of which is hinged to the chassis by means of a single axis hinge to turn about only one third rotation axis between an opened position and a closed position of the passenger compartment;
    wherein the hinges are arranged in proximity to the first rotation axis of the front wheels so that the projection on a horizontal plane of the hinges is within a rectangular area defined between the pair of front wheels; and
    wherein a third rotation axis of each hinge forms a second angle (β) ranging between 40° and 70° with the horizontal and on a vertical plane longitudinally arranged with respect to the car.

18. The car according to claim 17, wherein the second angle (β) ranges between 50° and 60°.

19. The car according to claim 17, wherein the second angle (β) is about 54°.

20. The car according to claim 17, wherein a third rotation axis for each hinge forms a first angle (a) ranging between 12° and 42° with the horizontal and on a vertical plane transversally arranged with respect to the car.

21. The car according to claim 20, wherein the first angle (α) ranges between 22° and 32°.

22. The car according to claim 20, wherein the first angle (α) is about 27°.

23. The car according to claim 17, wherein each front door comprises the rear portion of a wing of the corresponding front wheel and a corresponding door sill.

* * * * *